United States Patent Office 3,586,604
Patented June 22, 1971

---

3,586,604
PHOSPHORYLATION OF NUCLEOSIDES BY FERMENTATION
Akio Yamanoi, Tokyo, and Teruo Shiro, Chigasaki-shi, Kanagawa-ken, Japan, assignors to Ajinomoto Co., Inc., Tokyo, Japan
No Drawing. Filed June 7, 1968, Ser. No. 735,163
Claims priority, application Japan, June 16, 1967, 42/38,164
Int. Cl. C12d 13/06
U.S. Cl. 195—28                    2 Claims

ABSTRACT OF THE DISCLOSURE

Inosine, guanosine, xanthosine, adenosine, and 5-amino-4-imidazolecarboxamide riboside can be phosphorylated to the corresponding 5′-nucleotides by means of strains of Corynebacterium in otherwise conventional aqueous culture media containing inorganic phosphates.

---

The present invention relates to a method of producing 5′-nucleotides from the corresponding nucleosides by the action of microorganism.

It is known that 5′-nucleotides can be produced from the corresponding nucleosides in the presence of organic phosphate donors by microorganisms of the genera Pseudomonas, Staphylococcus, Serratia or Alcaligenes (U.S. Pats. 3,150,056, 3,152,967), (B.P.S. 979,073, 938,322, 965,350, 1,015,556, 1,012,547).

It has now been found that 5′-nucleotides can be produced from the corresponding nucleosides and inorganic phosphates in very high yields by bacteria belonging to the genus Corynebacterium when the bacteria are cultured in a nutrient medium containing the nucleoside and an inorganic phosphate.

Bacteria which can be used in the method of the present invention are characterized by their ability of producing a 5′-nucleotide from the corresponding nucleoside and an inorganic phosphate. Examples of such bacterial include Corynebacterium sp. AJ–1562 (ATCC 21251). Corynebacterium sp. AJ–1562 was isolated by the inventors, and has the following microbiological characteristics:

| | | |
|---|---|---|
| 1___ | Form of cells: (30° C., 24 hours). | Short rods in many variations, 0.5–0.8 x 1.0–3.0 microns, single or V-shaped pair arrangement, occasionally rudimentary branching, gram positive, non-motile, spore note formed. |
| 2___ | Nutrient agar colonies: (30° C., 7 days). | Circular, smooth, entire in the edge, dull lustre, opaque, butyrons, yellow, umbonate. |
| 3___ | Nutrient agar slant: (30° C., 7 days). | Moderate growth, linear, opaque, yellow. |
| 4___ | Nutrient broth: (30° C., 7 days). | No growth on the surface, suspended. |
| 5___ | Gelatin slab: (30° C., 7 days). | No liquifaction. |
| 6___ | Milk: (30° C., 7 days). | Not changed. |
| 7___ | B.C.P. milk: (30° C., 7 days). | Not decolorized, slightly changed to alkaline reaction. |
| 8___ | Nitrate: (30° C., 7 days). | Not reduced. |
| 9___ | Indol: (30° C., 7 days). | Not produced. |
| 10__ | Starch: (30° C., 7 days). | Not hydrolyzed. |
| 11__ | Acetyl methyl carbinol: (30° C., 7 days). | Not produced. |
| 12__ | Methylred test: (30° C., 7 days). | Negative. |
| 13__ | H₂S: (30° C., 15 days). | Slightly produced. |
| 14__ | Acid in peptone medium: (30° C., 10 days). | Produced from glucose and saccharose (gas not produced), not produced from glycerol, xylose, lactose and starch. |
| 15__ | Acid by Hugh & Leifson's method: (30° C., 10 days). | Produced from glucose and saccharose by aerobic and anaerobic fermentation (gas not produced), not produced from glycerol, xylose, lactose and starch by aerobic and anaerobic fermentation. |
| 16__ | Catalase | Positive. |
| 17__ | Aerobic | |
| 18__ | Temperature relation | 25–33° C. (optimum). |
| 19__ | Habitat | Soil. |

The characteristics of the strain AJ–1562 were compared with those listed in "Bergey's Manual of Determinative Bacteriology," 7th edition, and the strain could not be identified with a known microorganism. It has been deposited in the American Type Culture Collection with the accession number ATCC 21251 and is available to the public.

The phosphorylation of the nucleoside occurs simultaneously with the cultivation of the bacterium. Suitable nucleosides are of the formulas

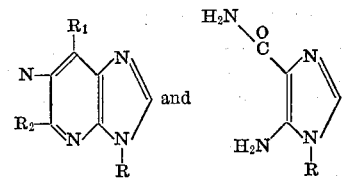

wherein $R_1$ and $R_2$ are hydrogen, hydroxyl, or amino, and R is ribofuranosyl, and include the purineribonucleosides inosine, guanosine, adenosine, and xanthosine, and the imidazoleribonucleoside 5-amino-4-imidazolecarboxamide riboside.

The nucleoside may be present in the initial culture medium, or may also be added to the medium during the cultivation. The nucleoside may be admixed to the medium in the form of crude crystals, as a solution, or in a fermentation broth from which inhibiting substances have been removed. For example, as inosine fermentation broth from which bacterial cells have been removed, or which has been sterilized can be used successfully as the culture medium for the bacterium.

The phosphate donor in the present invention is phosphoric acid or one of its salts, such as potassium dihydrogen phosphate, dipotassium hydrogen phosphate, ammonium phosphate, sodium phosphate or magnesium phosphate. The amount of the inorganic phosphate presented in the reaction medium varies with the bacterium used, and a high concentration of phosphate, for example 0.5–1.5 g./dl. phosphate ions, is preferably used.

The culture medium is otherwise conventional and includes sources of assimilable carbon and nitrogen, and the inorganic salts providing potassium, magnesium, phosphate, ferrous, manganese, and sulfate ions which are essential to the growth of bacteria. Suitable carbon sources include glucose, fructose, mannose, sucrose, ribose, xylose, starch hydrolyzate, molasses, acetic acid or gluconic acid, and ammonium chloride, ammonium nitrate, ammonium sulfate, urea, ammonia water or gaseous ammonia are suitable nitrogen sources. A greater amount of magnesium and phosphate ions than that required for bacterial growth is preferable for a good yield of 5′-nucleotide. Magnesium sulfate-heptahydrate is thus used in an amount of more than 0.5 g./dl. Organic compounds, such as vitamins, amino acids, yeast extracts, corn steep liquor, peptone, "Aji-Eki" (soybean protein hydrolyzate) or malt extracts may be additionally added to the medium. When a nucleoside fermentation broth is used as the nucleoside source, the addition of the organic compounds is usually not necessary.

Aerobic conditions are maintained by shaking, stirring, or aerating.

The pH of the medium is maintained between 5 and 9, and preferably between 5 and 7. The temperature should be between 25 and 40° C., and preferably between 30 and 35° C.

The cultivation is usually terminated in three to four days.

The 5′-nucleotide produced can be recovered from the reaction mixture by conventional methods such as by solvent extraction, evaporation, and the use of ion exchange resins.

EXAMPLE 1

A culture medium (A) containing:

Glucose—10 g./dl.
$KH_2PO_4$—2 g./dl.
$MgSO_4 \cdot 7H_2O$—0.8 g./dl.
$(NH_4)_2HPO_4$—0.5 g./dl.
Vitamin free casamino acid—0.5 g./dl.
Biotin—40 γ/l.
Nicotinic acid—1000 γ/l.
Inositol—5 γ/l.
Fe ions—2 p.p.m.
Guanosine—0.5 g./dl.
$CaCO_3$ (sterile) pH 6.5—5 g./dl.

was prepared, and 20 ml. batches of the medium were placed in 500 ml. shaking flasks, and sterilized at 110° C. for 5 minutes in an autoclave. One-fourth of a slant culture of Corynebacterium sp. AJ–1562 (ATCC 21251) which had previously been cultured at 31.5° C. for 24 hours on a medium containing 1 g./dl. yeast extract, 1 g./dl. peptone, 0.5 g./dl. NaCl, 0.2 g./dl. glucose and 2 g./dl. agar-agar, pH 7.0, was added to each batch which was then cultured at 31.5° C. for 85 hours with shaking. The broth was then found to contain 0.55 g./dl. disodium 5′-guanylate.heptahydrate.

When the guanosine was added 30 hours after the inoculation, 0.64 g./dl. disodium 5′-guanylate was present in the broth 60 hours after the guanosine addition.

When the vitamin free casamino acid, biotin, nicotinic acid and inositol were replaced with 2 g./dl. yeast extract (Medium B), 0.65 g./dl. disodium 5′-guanylate·$7H_2O$ was produced in a medium in which guanosine was initially present and which was cultured for 85 hours, and 0.75 g./dl. of disodium 5′-guanylate·$7H_2O$ (GMP) was found in a medium to which guanosine was added 30 hours after the inoculation.

EXAMPLE 2

A culture medium was prepared from 8 g./dl. starch hydrolyzate (glucose equivalent), 1.5 g./dl. ammonium chloride, 0.04 g./dl. magnesium sulfate heptahydrate, 0.1 g./dl. potassium dihydrogen phosphate, 0.001 g./dl. manganese sulfate, 0.04 g./dl. nitrogen (as soybean protein hydrolyzate) and 1.2 g./dl. dry yeast, and the pH of the medium was adjusted to 7.0 with ammonia. 20 ml. batches of the medium were placed in 500 ml. shaking flasks, sterilized at 110° C. for 5 minutes in an autoclave, and 2.5 g./dl. sterile calcium carbonate were added. The guanosine producing bacterium Bacillus subtilis G–9771 (ATCC 19221) which had previously been cultured on a medium containing 1 g./dl. yeast extract, 1 g./dl. peptone, 0.5 g./dl. NaCl and 8 g./dl. agar-agar, pH 7.0, was inoculated on each medium, and cultured at 30° C. for 74 hours with shaking. The culture broths contained 0.45 g./dl. guanosine and a small amount of inosine.

A part of the combined broths was sterilized at 110° C. for 5 minutes in an autoclave, and the remainder was centrifuged to remove solids mainly consisting of bacterial cells and calcium carbonate.

Phosphorylation mixtures were made up from the sterilized broth (A), a sterilized broth diluted with an equal amount of water (B), the clear liquid from the centrifugal separation (C), and a mixture of equal volumes of C and water to contain 8.0 g./dl. glucose, 0.5 g./dl. diammonium phosphate, 0.8 g./dl. magnesium phosphate·$7H_2O$ 2.0 g./dl. potassium dihydrogen phosphate, 20 γ/l. biotine, 1000 γ/l. nicotinic acid, 5 γ/l. inositol and 2.4 g./dl. total nitrogen (as soybean protein acid hydrolyzate). The pH of each solution was adjusted to 6.5 with KOH solution, and 20 ml. batches of the solutions were placed in 500 ml. shaking flasks, and sterilized at 110° C. for 5 minutes in an autoclave. After 5 g./dl. sterile $CaCO_3$ was added, each medium was inoculated with Corynebacterium sp. AJ–1562 (ATCC 21251) and cultured at 31° C. for 80 hours. The results obtained are listed in Table 1.

TABLE 1

| Mixture | Initial guanosine (g./dl.) | GMP produced (g./dl.) |
|---|---|---|
| A | 0.42 | 0.60 |
| B | 0.21 | 0.38 |
| C | 0.42 | 0.75 |
| D | 0.21 | 0.40 |

EXAMPLE 3

The inosine-guanosine producing Bacillus subtilis G–1136A (ATCC 19222) was inoculated on a medium of the same composition as the fermentation medium in Example 2, but the dry yeast was replaced with 0.03 g./dl. adenine and the amount of soybean protein acid hydrolyzate was increased to 0.08 g./dl. The bacterium was cultured at 31.5° C. for 68 hours with shaking. The broth contained 0.72 g./dl. guanosine and 0.69 g./dl. inosine. Hypoxanthine, guanine, 5′-inosinic acid and 5′-guanylic acid could not be found in the broth.

Phosphorylation mixtures A–D were prepared from the broth as in Example 2. Each mixture was inoculated with Corynebacterium sp. AJ–1562 (ATCC 21251), and cultured at 31.5° C. for 78 hours with shaking. The results obtained are listed in Table 2.

TABLE 2

| Reaction mixture | Initial | | Final | |
|---|---|---|---|---|
| | Inosine (g./dl.) | Guanosine (g./dl.) | IMP (g./dl.) | GMP (g./dl.) |
| A | 0.65 | 0.69 | 0.66 | 0.50 |
| B | 0.32 | 0.34 | 0.55 | 0.40 |
| C | 0.65 | 0.69 | 1.20 | 0.78 |
| D | 0.32 | 0.34 | 0.60 | 0.58 |

NOTE.—IMP: disodium 5′-inosinate·$7 \cdot 5H_2O$.

EXAMPLE 4

A culture medium containing 10 g./dl. glucose, 2 g./dl. $KH_2PO_4$, 0.5 g./dl. $(NH_4)_2HPO_4$, 1 g./dl. $MgSO \cdot 7H_2O$, 2 p.p.m. Fe ions, 1000 γ/l. nicotinic acid, 5 γ/l. inositol, 50 γ/l. biotin, 0.3 g./dl. of an amino acid mixture, and 5 g./dl. $CaCO_3$ was prepared and adjusted to pH 6.5 with NaOH solution. 0.2 g./dl. Adenosine, 0.2 g./dl. xanthosine or 0.2 g./dl. AICA-riboside were respectively added to 20 ml. batches of the medium in 500 ml. shaking flasks which were sterilized at 110° C. for 5 minutes in an autoclave. Corynebacterium sp. AJ–1562 (ATCC 21251) was inoculated on the media, and cultured at 31.5° C. for 70 hours with shaking.

The results obtained are listed in Table 3.

TABLE 3

| Nucleoside | Nucleotide produced | G./dl. |
|---|---|---|
| Xanthosine (0.2 g./dl.) | 5′-xanthylic acid | 0.31 |
| Adenosine (0.2 g./dl.) | 5′-adenylic acid | 0.13 |
| AICA-riboside (0.2 g./dl.) | AICA-riboside-5′-monophosphate | 0.11 |

The amino acid mixture used in the culture medium contained 40 mg. percent lysine, 25 mg. percent arginine, 11 mg. percent histidine, 8 mg. percent methionine, 8 mg. percent tyrosine, 16 mg. percent phenylalanine, 65 mg. percent glutamic acid, 16 mg. percent proline, 22 mg. percent glycine, 22 mg. percent isoleucine, 32 mg. percent leucine and 35 mg. percent alanine.

EXAMPLE 5

A culture medium containing 8 g./dl. starch acid hydrolyzate (glucose equivalent), 1.7 g./dl. $NH_4Cl$, 0.08 g./dl. KCl, 2 p.p.m. Mn ions, 2 p.p.m. Fe ions, 0.04 g./dl. $MgSO_4 \cdot 7H_2O$, 0.015 g./dl. nitrogen as soybean protein acid hydrolyzate, 0.11 g./dl. yeast ribonucleic acid and 4 g./dl. sterile $CaCO_3$ was prepared and adjusted to pH 7.0 with KOH solution. 20 ml. batches of the medium in 500 ml. shaking flasks were sterilized at 110° C. for 5 minutes in an autoclave, and were each inoculated with a loopful of an AICA-riboside producing bacterium, *Bacillus megaterium* MA–336 (ATCC 15117) which had previously been cultured at 31.5° C. for 24 hours on a medium consisting of 1 g./dl. yeast extract, 1% peptone, 0.5 g./dl. NaCl and 2 g./dl. agar-agar (pH 7.0). Each medium was cultured at 31.5° C. for 70 hours with shaking. The broth then contained 0.93 g./dl. AICA-riboside.

It was centrifuged to remove bacterial cells and $CaCO_3$, the supernatant solution was diluted to two times its initial volume with water, and was supplemented to contain 10 g./dl. glucose, 2 g./dl. $KH_2PO_4$, 0.5 g./dl. $(NH_4)_2HPO_4$, 1 g./dl. $MgSO_4·7H_2O$, 2 p.p.m. Fe ions, 1000 γ/l. nicotinic acid, 5 γ/l. inositol, 50 γ/l. biotine, 0.3 g./dl. of the afore-mentioned amino acid mixture and 5 g./dl. $CaCO_3$. The pH of the phosphorylation mixture was adjusted to 6.5 with KOH solution, and 20 ml. batches in 500 ml. shaking flasks were sterilized at 110° C. for 5 minutes and inoculated with Corynebacterium sp. AJ–1562 (ATCC 21251). After 74 hours shaking, the broth contained 0.30 g./dl. AICA-riboside-5'-phosphate.

EXAMPLE 6

A culture medium containing 7 g./dl. glucose, 1.5 g./dl. $NH_4Cl$, 0.1 g./dl. $KH_2PO_4$, 0.04 g./dl. $MgSO_4·7H_2O$, 2 p.p.m. Fe ions, 2 p.p.m. Mn ions, 0.5 g./dl. vitamin free casamino acid (Difco Co.) and 10 mg./dl. guanine was adjusted to pH 7.2, and 20 ml. batches of the medium were placed in 500 ml. shaking flasks. Each batch was sterilized at 110° C. for 5 minutes in an autoclave, 2.5 g./dl. sterile $CaCO_3$ were added, and the media were each inoculated with a loopful of a xanthosine producing bacterium, *Bacillus subtilis* SX–15 (ATCC 15039). A fermentation was then carried out at 31.5° C. for 70 hours with shaking, and the broth contained 0.35 g./dl. xanthosine.

The cultured broth was centrifuged to remove bacterial cells and $CaCO_3$, supplemented with the same nutrients as in Example 5, and sterilized. The reaction mixture obtained was inoculated with Corynebacterium sp. AJ–1562 and cultured at 31.4° C. for 80 hours with shaking. The cultured broth contained 0.44 g./dl. 5'-xanthylic acid.

EXAMPLE 7

To the culture medium of Example 4, 0.2 g./dl. inosine, 0.2 g./dl. guanosine and 0.2 g./dl. xanthosine were jointly added, and the mixture obtained was inoculated with Corynebacterium sp. AJ–1562 and cultured at 31.5° C. for 80 hours with shaking. The broth then contained 0.35 g./dl. 5'-inosinic acid, 0.24 g./dl. 5'-guanylic acid and 0.32 g./dl. xanthylic acid, together with a small amount of guanosine-5'-diphosphate.

EXAMPLE 8

To the culture medium of Example 5, 0.2 g./dl. guanosine, 0.2 g./dl. adenosine, and 0.2 g./dl. xanthosine were jointly added, and the phosphorylation was performed as in Example 7.

The reaction mixture contained 0.26 g./dl. 5'-guanylic acid, 0.19 g./dl. 5'-adenylic acid and 0.28 g./dl. 5'-xanthylic acid, together with small amounts of guanosine-5'-diphosphate and adenosine-5'-triphosphate.

EXAMPLE 9

A culture medium containing 10 g./dl. glucose, 2 g./dl. $KH_2PO_4$, 0.8 g./dl. $MgSO_4·7H_2O$, 0.5 g./dl.

$(NH_4)_2HPO_4$ 70 mg./dl. lysine, 45 mg./dl. arginine, 20 mg./dl. histidine, 15 mg./dl. methionine, 15 mg./dl. tyrosine, 30 mg./dl. phenylalanine, 120 mg./dl. glutamic acid, 30 mg./dl. proline, 40 mg./dl. glycine, 40 mg./dl. isoleucine, 60 mg./dl. leucine, 65 mg./dl. alanine, 40 γ/l biotin, 1000 γ/l nicotinic acid, 5 γ/l inositol, 2 p.p.m. Fe ions, 0.6 g./dl. inosine and 5 g./dl. $CaCO_3$ (separately sterilized) was adjusted to pH 6.5 with KOH solution, and 20 ml. batches in 500 ml. shaking flasks were sterilized at 110° C. for 5 minutes.

One-fourth of a seed culture of Corynebacterium sp. AJ–1562 (ATCC 21251) which had previously been cultured at 31.5° C. for 24 hours on a nutrient slant carrying 1 g./dl. yeast extract, 1 g./dl. peptone, 0.5 g./dl. NaCl, 0.2 g./dl. glucose and 2 g./dl. agar-agar (pH 7.0) was inoculated on the medium, and cultured at 31.5° C. for 70 hours with shaking. The broth then contained 1.18 g./dl. disodium 5'-inosinate·7·5$H_2O$ (100% yield). The broth contained only inosine and 5'-inosinic acid, and no other nucleotides.

EXAMPLE 10

A culture medium consisting of 8% glucose, 0.1 g./dl. $KH_2PO_4$, 0.04 g./dl. $MgSO_4·7H_2O$, 1.5 g./dl. $NH_4Cl$, 2 p.p.m. Fe ions, 0.15 g./dl. KCl, each 40 mg./dl. isoleucine, leucine, methionine, glycine, valine, threonine, phenylalanine and lysine, 20 mg./dl. histidine, 17.5 mg./dl. adenine and 2.5 g./dl. $CaCO_3$ (separately sterilized) was adjusted to pH 7.2 with KOH solution, and 20 ml. batches in 500 ml. flasks were sterilized at 110° C. for 5 minutes in an autoclave.

Each medium was inoculated with a loopful of an inosine producing bacterium, *Bacillus subtilis* No. 1364 (ATCC 13952) which had previously been cultured at 31.5° C. for 24 hours on 1 g./dl. yeast extract, 1 g./dl. peptone, 0.5 g./dl. NaCl and 2 g./dl. agar-agar (pH 7.0), and cultured at 31.5° C. for 72 hours with shaking.

The cultured broth contained 0.88 g./dl. inosine and did not contain hypoxanthine.

Half of the combined culture broths were sterilized at 110° C. for 5 minutes in an autoclave (A), and the other half was centrifuged to remove bacterial cells and $CaCO_3(C)$ The sterilized broth, centrifuged broth and mixtures of each with equal volumes of water (B and D) were supplemented to make phosphorylation mixtures containing 8 g./dl. glucose, 0.5 g./dl. $(NH_4)_2HPO_4$, 0.8 g./dl.

$MgSO_4·7H_2O$ 2 g./dl. $KH_2PO_4$, 20 γ/l. biotin, 1000 γ/l. nicotinic acid, 5 γ/l. inositol and 40 mg./dl. each of the 12 amino acids listed in Example 9. The pH of the mixtures was adjusted to 6.5 with KOH solution, and 20 ml. batches in 500 ml. shaking flasks were sterilized at 110° C. for 5 minutes in an autoclave. The media were inoculated with Corynebacterium sp. AJ–1562 (ATCC 21251), and cultured at 31.5° C. for 80 hours with shaking. The results obtained are listed in Table 4.

TABLE 4

| Mixture | Initial inosine (g./dl.) | IMP produced (g./dl.) |
| --- | --- | --- |
| A | 0.88 | 0.81 |
| B | 0.44 | 0.71 |
| C | 0.88 | 1.45 |
| D | 0.44 | 0.86 |

What is claimed is:
1. A method of phosphorylating a ribonucleoside of the formula

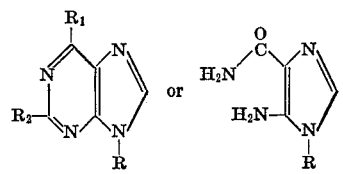

to the corresponding 5' nucleotide which comprises:
(a) culturing the bacterium Corynebacterium sp. ATCC 21251 under aerobic conditions on an aqueous nutrient medium including a source of assimilable carbon, a source of assimilable nitrogen, inorganic salts essential to the growth of said bacterium, said ribonucleoside, and phosphoric acid or an inorganic salt of phosphoric acid dissolved in said medium until said 5'-nucleotide is formed in said medium, (b) recovering said 5'-nucleotide, in said formulas $R_1$ and $R_2$ being hydrogen, hydroxyl or amino, and R being ribofuranosyl.

2. A method as set forth in claim 1, wherein said medium contains 0.5–1.5 g./dl. phosphate ions.

References Cited

UNITED STATES PATENTS

| 3,268,415 | 8/1966 | Kinoshita et al. | 195—28(N) |
|---|---|---|---|
| 3,308,036 | 3/1967 | Nakayama et al. | 195—28(N) |
| 3,313,710 | 4/1967 | Kinoshita et al. | 195—28(N) |
| 3,328,261 | 6/1967 | Nakayama et al. | 195—28(N) |
| 3,359,177 | 12/1967 | Nara et al. | 195—28(N) |
| 3,410,753 | 11/1968 | Demain et al. | 195—28(N) |

ALVIN E. TANENHOLTZ, Primary Examiner